Dec. 10, 1957  J A. CAMPBELL ET AL  2,816,119
STEROID PRODUCTION
Filed May 3, 1954
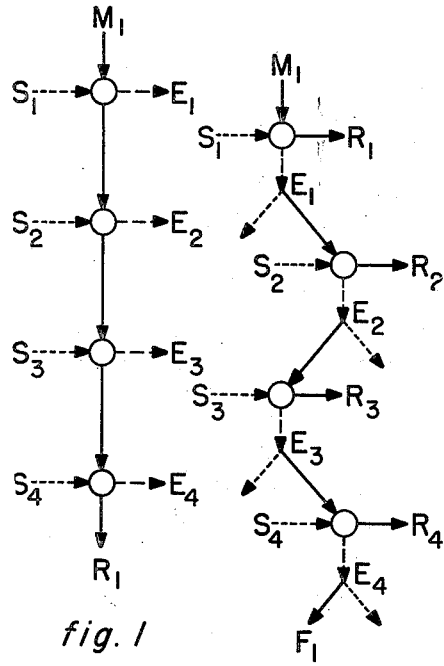
fig. 1
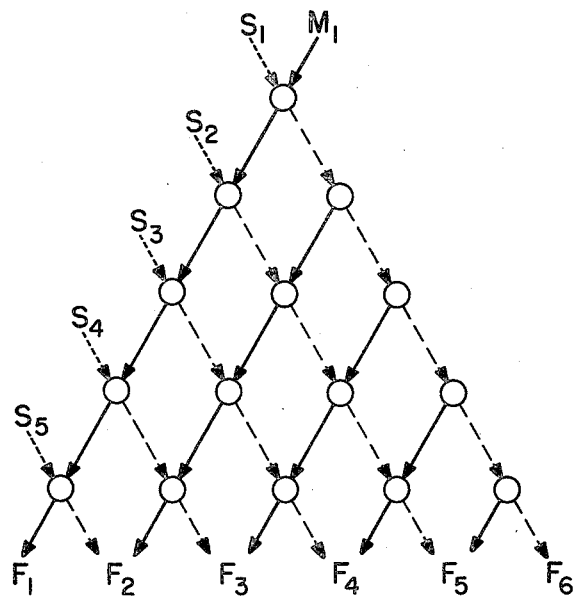
fig. 2
fig. 3
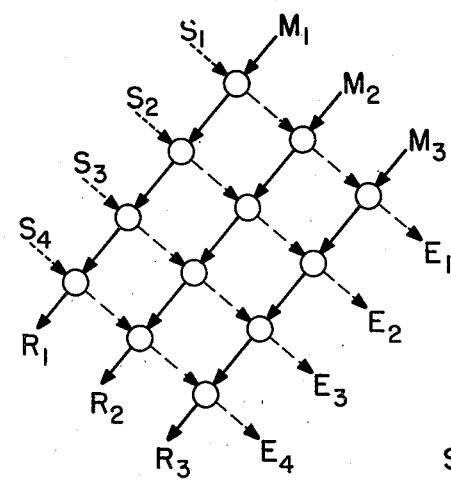
fig. 4
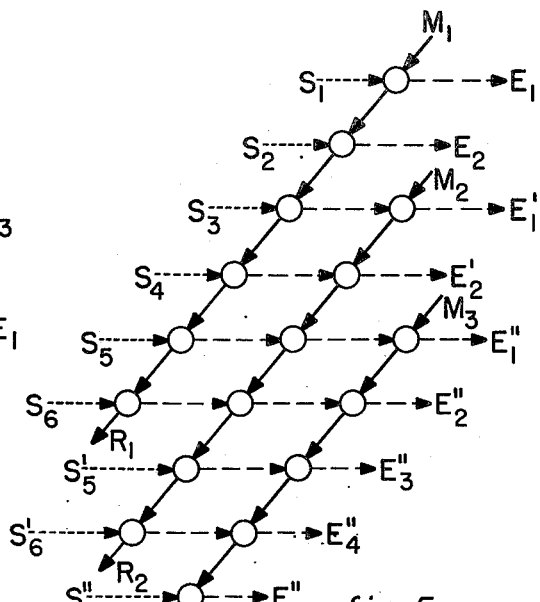
fig. 5
→ SOLID
--→ MOTHER LIQUOR
······→ SOLVENT
INVENTORS
J A. CAMPBELL, DOUGLAS A. SHEPHERD
ARNOLD C. OTT AND BRYON A. JOHNSON
BY *Gordon W. Hueschen*
ATTORNEY United States Patent Office 2,816,119
Patented Dec. 10, 1957

2,816,119

STEROID PRODUCTION

J Allan Campbell and Douglas A. Shepherd, Kalamazoo Township, Kalamazoo County, and Arnold C. Ott and Byron A. Johnson, Kalamazoo, Mich., assignors to The Upjohn Company, Kalamazoo, Mich., a corporation of Michigan Application May 3, 1954, Serial No. 427,078

32 Claims. (Cl. 260—397.2)

This invention relates to a novel process for the separation and the purification of certain steroids, more particularly, to the separation and purification of stigmasterol and sitosterol and to a novel procedure for their separation and novel compounds produced therein.

It is an object of the present invention to provide a novel process for the separation and purification of stigmasterol and/or sitosterol. Another object is the provision of a process for the isolation of a stigmasteryl carbamate from a mixture with sitosteryl carbamate. Still another object is the provision of a process for the isolation of a sitosteryl carbamate from a mixture with a stigmasteryl carbamate. Still another object is the provision of a process for the separation of stigmasteryl α-naphthylcarbamate from a mixture with sitosteryl α-naphthylcarbamate in high purity. A further object is the provision of a novel procedure for the separation of stigmasteryl α-naphthylcarbamate in high yield and in high purity from a mixture with sitosteryl α-naphthylcarbamate. Yet another object is the provision of the novel soysteryl α-naphthylcarbamate, stigmasteryl α-naphthylcarbamate, and sitosteryl α-naphthylcarbamate. Other objects will be apparent to those skilled in the art to which this invention pertains.

According to the process of the present invention, a mixture of a stigmasteryl carbamate and the corresponding sitosteryl carbamate is particularly dissolved in an organic solvent and the portion enriched with the desired carbamate is separated and once more partially dissolved in an organic solvent, the separation step of the enriched portion and partial solution step each being repeated at least once more. The starting mixture of stigmasteryl carbamate and a corresponding sitosteryl carbamate is ordinarily obtained by the conversion of a mixture of stigmasterol and at least one of the sitosterols to one of their corresponding carbamates.

Reference is made to the accompanying drawings which illustrate various fractionation techniques available for the separation or purification of one or more of the components of the mixture [see Morton, Laboratory Technique in Organic Chemistry, McGraw-Hill Book Company, Inc. (1938), chapter VII]. In the drawings, M refers to a portion of the starting mixture of a stigmasteryl carbamate and the corresponding carbamate of sitosterol, S refers to a volume of solvent, E refers to a solution, R refers to the undissolved portion of the starting mixture and F refers to a fraction of the original mixture.

In the drawings:

Fig. 1 represents a simple repeated fractionation with solvent in which the undissolved portion is re-treated with solvent.

Fig. 2 represents a simple repeated fractionation with solvent in which the dissolved portion is freed of solvent and then re-treated with solvent.

Fig. 3 represents a triangular fractionation wherein both the undissolved and dissolved portions are further fractionated. In this procedure, after fractionating the mixture with solvent into a portion dissolved in the mother liquor and an undissolved portion, the undissolved portion is again fractionated with more solvent into dissolved and undissolved portions, and the mother liquor consisting the dissolved portion is concentrated, diluted with other solvent, or cooled, to precipitate a portion of the dissolved solids which is then combined with the mother liquor obtained from the second fractionation of the undissolved portion. This procedure is then repeated until material of desired purity is obtained.

Fig. 4 represents a batchwise countercurrent type of fractionation wherein a portion of the starting mixture is serially treated with solvent to give several mother liquors which are used in the order obtained to serially fractionate a second portion of the mixture, adding additional solvent to the mother liquors to maintain a constant volume, if desired.

Fig. 5 represents a batch-wise countercurrent type of fractionation wherein only a portion of the mother liquors are employed as fractionating solvents with fresh solvent being employed after the mother liquors.

Stigmasterol and sitosterol commonly occur together in various natural sources, e. g., soybeans, sugar cane oil, calabar and coffee bean, etc. When the sterols are recovered from these natural sources, the stigmasterol and sitosterol are recovered as a mixture. Since stigmasterol is ordinarily a minor constituent of these sterol fractions on a weight basis, the crude sterols when obtained from the usual sources require an extensive purification before stigmasterol of reasonable purity is obtained. For most purposes, the separation of stigmasterol and sitosterol is highly advantageous, because the synthetic techniques of converting stigmasterol into hormones or hormone-like compounds, e. g., progesterone, androsterone, or dehydroepiandrosterone, etc, are quite dissimilar from those employing sitosterol as the starting steroid.

The processes heretofore available for the separation of stigmasterol from the sitosterols have been complicated and relatively ineffective. Windaus and Hauth, Ber., 39, 4378 (1906), developed a technique of separating stigmasterol from the sitosterols by preparing their acetates, brominating the double bonds of the steryl acetates, separating the lesser soluble stigmasteryl acetate tetrabromide which is then debrominated and saponified to regenerate stigmasterol. The process is disadvantageous in its multiplicity of steps and its failure to recover much of the stigmasterol by this process [Neu and Ehrbächer, Arch. Pharm., 283, 227 (1950)].

It has now been found in accordance with this invention that stigmasterol or sitosterol, or both, as a mixture of one of their carbamates, are easily separated or purified by contacting the mixed steryl carbamates with an organic solvent according to the procedure described hereinafter. If the available steroid mixture consists of stigmasterol and sitosterol, e. g. soysterols, the sterol mixture is converted to a mixture of one of their corresponding carbamates prior to the separation step. This can be accomplished by any of several methods, prototypes for which may be found in the citations here listed. For example, the stigmasterol and sitosterol can be reacted with α-naphthylisocyanate [Neuberg and Kansky, Biochem. Z., 277, 345 (1910)]. Another technique is to react a mixture of stigmasterol and sitosterol with phosgene to produce their chloroformate esters which are then reacted with α-naphthylamine to produce the α-naphthylcarbamate esters of stigmasterol and sitosterol [Wieland, Honold and Pascual-Vila, Z. Phys. Chem., 130, 335 (1923)]. Other techniques involve the reaction of the stigmasterol-sitosterol mixture with α-naphthylcarbamyl chloride [Lesser, Kranepul and Gad, Ber., 58, 2122 (1925)]; Herzog, Ber., 40, 1831 (1907)] or with α-naphthoic acid azide [Sah et al., Science Repts. Natl.

Tsing Hua Univ., (A) 3, 109 (1935)]. See also Cheronis and Entrikin, "Semimicro Quantitative Organic Analysis," Crowell Co., New York, page 227 (1947); "Org. Syn.," Collective Vol. I, 140 (1941); and Kraft, J. Am. Chem. Soc., 70, 3570 (1948). Among these methods, the $\alpha$-naphthylisocyanate method is the most convenient and is usually preferred.

Stigmasteryl $\alpha$-naphthylcarbamate and sitosteryl $\alpha$-naphthylcarbamate can be prepared in almost any inert organic diluent in which the reactants are somewhat soluble and, at least in the case of the $\alpha$-naphthylisocyanate method, no solvent need be employed. Depending somewhat upon the particular reagent employed to produce the steryl $\alpha$-naphthylcarbamates, reaction temperatures between about zero degrees centigrade and the boiling point of the reaction mixture can be employed. Reactions employing higher temperatures than about 170 degrees centigrade are usually complicated somewhat by accompanying side reactions. Reactions employing temperatures substantially below room temperature usually require prolonged reaction times and the reaction is sometimes complicated by the precipitation of the reactants from the reaction mixture. The solvent employed in the preparation of the $\alpha$-naphthylcarbamates can sometimes advantageously be employed as the separation solvent, thereby eliminating any transfer or handling of the reaction mixture.

In carrying out the separation or purification step of the present invention, a mixture consisting essentially of one of the carbamates of stigmasterol and of at least one of the sitosterols is fractionated into a dissolved portion and an undissolved portion by contacting the mixture with organic solvent. The portion which is enriched with the desired carbamate which is to be separated or purified is then separated from the organic solvent and the portion enriched with the undesired carbamate. The portion enriched with the desired carbamate is then fractionated into a dissolved and an undissolved portion by contacting the enriched portion with organic solvent. The steps of separating the portion enriched with the desired carbamate from the organic solvent and the portion enriched with the undesired carbamate and fractionating the portion enriched with the desired carbamate into a dissolved portion and an undissolved portion by contacting the enriched portion with an organic solvent are repeated at least once more.

The fractionation of the mixture of steryl carbamates into an undissolved portion and a dissolved portion can be achieved by crystallization, i. e., dissolving all of the solids and then precipitating a portion of the dissolved solids, or by leaching (extracting), i. e., by dissolving only a portion of the total solids.

Of the procedures for separating the steryl carbamate mixture into a dissolved portion and an undissolved portion, leaching of the mixture is preferred. The method is uncomplicated, usually employing room temperature, and requires neither distillation apparatus nor heating and cooling.

Solvents which can be employed in the separation step include the aliphatic, alicyclic, and aromatic hydrocarbons, and like neutral non-polar solvents; esters and ketones, and like basic polar solvents; halogenated aromatic and aliphatic hydrocarbons, and like neutral polar solvents; and other organic liquids in which at least one of the steryl carbamates is significantly soluble. The hydrocarbons and chlorinated hydrocarbons, both aromatic and aliphatic, are ordinarily the most useful, with chlorobenzene producing outstandingly desirable results in a countercurrent leaching technique such as described in the examples hereinafter.

While a wide variety of organic solvents can be used to effect the separation of the mixture of steryl carbamates in accordance with the process of the invention, the more efficient fractionations employ those solvents combining high absolute solubility with high differential solubility. Some solvents, for example, while exhibiting a high differential solubility, that is, a high ratio of solubility of one of the steryl carbamates of the mixture to the solubility of the other steryl carbamate of the mixture, have such low absolute solubility that excessively large volumes of solvent are required to effect the separation, thus reducing the efficiency of the operation. High differential solubility and high absolute solubility, however, are not the only factors which determine the most efficient solvents. For example, some solvents, while exhibiting a very high differential solubility, appear to be less efficient than other solvents with lower differential solubility ratios. As shown in Table II below, when comparing the solubilities of stigmasteryl $\alpha$-naphthylcarbamate and sitosteryl $\alpha$-naphthylcarbamate in various solvents, cyclohexane has a higher differential solubility ratio than chlorobenzene. However, when fractionating a mixture of stigmasteryl $\alpha$-naphthylcarbamate and sitosteryl $\alpha$-naphthylcarbamates, chlorobenzene is the solvent of choice over cyclohexane because, although having a lower solubility ratio, chlorobenzene is a more efficient solvent in the separation and will separate stigmasteryl $\alpha$-naphthylcarbamate of higher purity and in higher yield than cyclohexane. Moreover, the higher absolute solubility of chlorobenzene for the two carbamates reduces the total volume of solvent necessary and therefore makes the process more efficient on a large scale. A higher recovery of stigmasteryl $\alpha$-naphthylcarbamate of somewhat lower purity can sometimes be obtained with solvents other than chlorobenzene, however.

Ordinarily, the stigmasteryl carbamate derivative will be found to be more insoluble than the corresponding sitosteryl carbamate derivative. Thus the portion of the mixture which is undissolved by the solvent usually is the portion which is enriched with the stigmasteryl derivative.

The fractionations are advantageously carried out at room temperature, i. e., leaching the mixture with solvent at room temperature and conducting the separation at room temperature or dissolving the mixture at a temperature above room temperature and thereafter precipitating a portion of the dissolved material at room temperature. Not only is room temperature preferred for convenience, but the solvents are usually somewhat more efficient at room temperature than they are at more elevated temperatures. For the most part, solvents appear to lose some of their selectivity at more elevated temperatures and therefore usually have lower purification efficiencies.

Of the variables which influence the efficiency of the process of the invention, the most important is the particular carbamate mixture to be separated. Whereas the process of this invention broadly is applicable to the separation of any mixture consisting essentially of a carbamate of stigmasterol and the corresponding carbamate of at least one of the sitosterols, the preferred and more useful starting carbamate mixtures consist of a stigmasteryl arylcarbamate and the corresponding arylcarbamate of sitosterol. Examples of these include the phenylcarbamate, $\alpha$-naphthylcarbamate, o-biphenylcarbamate, p-biphenylcarbamate, o-tolylcarbamate, m-nitrophenylcarbamate. Of the arylcarbamates, the phenylcarbamate and the $\alpha$-naphthylcarbamate of the soysterols are preferred, especially the $\alpha$-naphthylcarbamate mixture which is the most readily separated by the process of this invention and affords separated stigmasteryl $\alpha$-naphthylcarbamate and/or sitosteryl $\alpha$-naphthylcarbamate of high purity. Another efficient carbamate mixture is soysteryl phenylcarbamate. Tables I and II below give the solubilities of stigmasteryl and sitosteryl phenylcarbamates in various solvents and the ratio of their two solubilities and the solubilities of stigmasteryl $\alpha$-naphthylcarbamate and sitosteryl $\alpha$-naphtylcarbamates and their solubility ratios in various common organic solvents.

In determining the solubilities of stigmasteryl and sitosteryl phenylcarbamates and α-naphthylcarbamates at room temperature, the hot solvent was saturated with excess carbamate and the mixture allowed to stand for several hours at 27 degrees centigrade. The mixture was then filtered and a measured volume of the filtrate transferred to a tared weighing dish and evaporated. The residue was dried at fifty degrees centigrade at reduced pressure. The weight of residue obtained from the measured solution was then converted to grams per 100 milliliters of solution. The solubilities of these carbamates at the boiling points of the solvents were determined by removing an aliquot of the solution at the boiling point, the solution weighed, the solvent distilled and the residue then weighed.

TABLE I.—SOLUBILITIES OF STERYL PHENYL-CARBAMATES IN VARIOUS SOLVENTS

| Solvent, 27° C. | Solubility g./100 ml. solvent | | Ratio |
|---|---|---|---|
| | Sitosteryl Phenyl-carbamate | Stigmasteryl Phenyl-carbamate | |
| cyclohexane | 2.2 | 0.4 | 5.5 |
| benzene | 16.0 | 4.1 | 3.9 |
| ethyl acetate | 11.3 | 1.2 | 9.3 |
| methyl ethyl ketone | 5.4 | 1.4 | 3.8 |
| propylene chloride | 9.6 | 2.0 | 4.8 |
| diethyl ether | 5.8 | 1.5 | 3.9 |
| pyridine | 15.5 | 5.1 | 3.0 |
| isopropyl alcohol | 0.9 | 0.2 | 4.5 |
| chlorobenzene | 16.6 | | |
| carbon tetrachloride | 9.0 | | |
| dimethylformamide | 0.5 | | |
| acetonitrile | 0.05 | | |
| methyl isobutyl ketone | 2.8 | | |
| nitrobenzene | 2.1 | | |
| toluene | 4.6 | | |
| methyl cyclohexane | 1.1 | | |
| hexane | 0.5 | | |

TABLE II.—SOLUBILITIES OF STERYL α-NAPHTHYLCARBAMATES IN VARIOUS SOLVENTS

| Solvent, 25° C. | Solubility g./100 ml. solvent | | Ratio |
|---|---|---|---|
| | Sitosteryl α-Naphthyl-carbamate | Stigmasteryl α-Naphthyl-carbamate | |
| benzene | 13.8 | 0.4 | 32 |
| benzene (80° C.; per 100 gr. sol.) | 50 | 3.7 | 14 |
| ethyl acetate | 2.5 | 0.4 | 6.2 |
| isopropyl alcohol | 0.3 | 0.01 | 30 |
| chlorobenzene | 19.9 | 0.7 | 29 |
| chlorobenzene (132° C.; per 100 gr. sol.) | 66.4 | 7.5 | 7.5 |
| propylene chloride | 8.8 | 0.3 | 2.9 |
| dimethylformamide | 0.9 | 0.1 | 9 |
| diethyl ether | 4.3 | 0.1 | 43 |
| nitrobenzene | 5.8 | 0.3 | 19 |
| methoxyethanol | 0.4 | 0.01 | 40 |
| cyclohexane | 1.5 | 0.04 | 37 |
| cyclohexane (80° C.; per 100 gr. sol.) | 31.5 | 1.1 | 29 |
| methyl ethyl ketone | 3.5 | 0.16 | 22 |
| methyl ethyl ketone (80° C.; per 100 gr. sol.) | 38.1 | 1.6 | 24 |
| hexane | 0.4 | ≅0.01 | 40 |
| hexane (60° C.; per 100 gr. sol.) | 3.6 | 0.2 | 18 |
| 1:1 cyclohexane-CH₂Cl₂ | 26.3 | 1.1 | 24 |

It is readily apparent from Tables I and II that one of the factors which makes the α-naphthylcarbamate mixture a mixture which is separated more efficiently, is the high solubility ratio of sitosteryl α-naphthylcarbamate to stigmastryl α-naphthylcarbamate in organic solvents.

During a separation with organic solvent, the mixture is preferably stirred to ensure complete contact of the solvent with all the solid particles. The particle size of the solid should be small enough to prevent significant amounts of the solid from being shielded from the solvent by the solid on the surface of the particles. Material of 100 mesh size or smaller particle size is sufficiently small to achieve efficient separation, although material containing much larger particles is operable starting material.

To overcome the low yield of pure separated carbamate which is obtained from a repeated crystallization or leaching procedure such as is shown in Figures 1 and 2 of the drawings, other more efficient techniques can be employed. For example, a triangular crystallization of the type shown in Figure 3 of the drawings and illustrated in Examples 4 to 13 hereinafter recovers all of the starting material as several fractions of varying composition.

A more preferred technique of recovering more of the available desired carbamate in the original mixture involves a countercurrent type of fractionation. Figure 4 of the drawings illustrates a batch-wise countercurrent type procedure which employs the mother liquors from one separation as the solvent in further separations, thereby reducing the loss of desired carbamate in the mother liquors. A more efficient batch-wise countercurrent separation technique is illustrated in Figure 5 of the drawings wherein only a portion of the mother liquors are used along with fresh solvent. The proportion of mother liquors which will be reused in a procedure of this type and the portion of fresh solvent which is used will vary some with the particular carbamate and solvent employed. An example of this type of separation may be found in Example 19 hereinafter.

Ordinarily, a leaching separation gives higher yields of more highly purified separated carbamate and for this reason is usually the preferred procedure.

A preferred leaching technique involves the use of a mixture of stigmasteryl and sitosteryl α-naphthylcarbamates. When using this starting mixture, the mixture is leached to leave an undissolved portion enriched with stigmasteryl α-naphthylcarbamate which is separated and leached again with solvent. The undissolved portion is then separated and leached at least once more. If this procedure is continued, substantially pure stigmasteryl α-naphthylcarbamate ultimately will be obtained as the remaining undissolved solid, with substantially pure sitosteryl α-naphthylcarbamate being obtained in the first mother liquor. Preferably the leaching is conducted at about room temperature, i. e., between about twenty and about thirty degrees centigrade with the preferred leaching solvent being chlorobenzene.

A refinement of the above described leaching procedure involves at least two leaching operations, each of which uses a volume of between about one and about three milliliters of chlorobenzene per gram of original mixture to be fractionated, with the chlorobenzene containing sitosteryl α-naphthylcarbamate and stigmasteryl α-naphthylcarbamate, the amount of sitosteryl α-naphthylcarbamate, decreasing and the proportion of stigmasteryl α-naphthylcarbamate to sitosteryl α-naphthylcarbamate increasing with successive portions of the chlorobenzene, followed by at least one more leaching operation using chlorobenzene of a volume between about one and about three milliliters per gram of the original mixture. When employing this procedure, high purity stigmasteryl α-naphthylcarbamate is obtained. This leaching procedure is then repeated with a second portion of steryl α-naphthylcarbamate, employing at least all except the first two mother liquors, in the order obtained, from the fractionation of the first steryl α-naphthylcarbamate portion, followed, as with the first portion, by a portion of chlorobenzene. When this procedure is repeated several times, a batch-wise countercurrent fractionation of the type illustrated by Example 19 hereinafter is performed. This refinement results in the isolation of stigmasteryl α-naphthylcarbamate of high purity and yield. Here also the preferred fractionation temperature is room temperature and the leaching operations involving chlorobenzene containing dissolved steryl α-naphthylcarbamate are preferably performed at least four times and the final leaching operation with chlorobenzene is preferably performed at least twice. The preferred volume of solvent under these conditions for each leaching operation is about two milliliters per gram of the original mixture.

The stigmasteryl carbamate or sitosteryl carbamate separated or purified according to the process of this invention can be assayed by hydrolyzing the isolated carbamate to produce the free sterol which is then titrated with a standardized bromine solution according to procedures known in the art. Pure stigmasterol will titrate two moles of bromine per mole of sterol and pure γ-sitosteryl, for example, will titrate one mole of bromine per mole of steroid.

Stigmasteryl carbamates and sitosteryl carbamates, which are soysteryl carbamates, are represented by the following structural formulae:

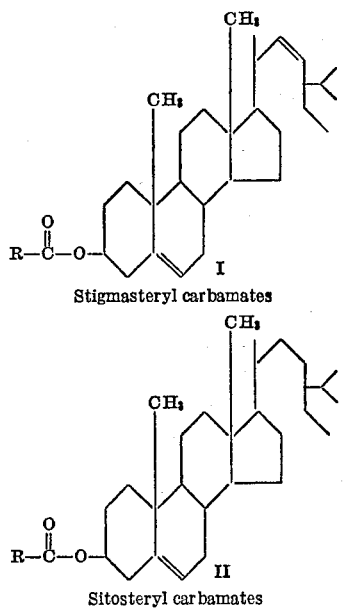

Stigmasteryl carbamates

Sitosteryl carbamates wherein R in each formula is an amino group, e. g., an unsubstituted, mono or disubstituted aromatic, aliphatic, carbocyclic or heterocyclic amino group. Representative soysteryl carbamates include those wherein R is $NH_2$, methylamino, n-butylamino, octylamino, dodecylamino, phenylamino, benzylamino, para-biphenylamino, α-naphthylamino, cyclohexylamino, clyclopentylamino, pyrrolidyl, piperidyl, morpholino, 2-pyridylamino, dimethylamino, diphenylamino, and diethylamino. The term "soysteryl carbamate" defines a mixture of steryl carbamates obtained from the esterification of the soybean sterols to produce a mixture of one of their carbamates. Soysterols consist predominantly of about ten to about 25 percent stigmasterol and about 75 to ninety percent sitosterol, the term "sitosterol" defining the mixture of side-chain saturated sterols, e. g., α-sitosterol, $α_1$-sitosterol, $α_2$-sitosterol, $α_3$-sitosterol, β-sitosterol and γ-sitosterol, the latter being the predominant soysterol [see Fieser and Fieser, "Natural Products Related to Phenanthrene," 159, 285 (1949); Markley, "Soybeans and Soybean Products," Interscience Publishers, 199, 836 (1950)].

The α-naphthylcarbamate of cholesterol [Neuberg and Hirshberg, Biochem. Z., 27, 345 (1910)] and of ergosterol [Windaus, Nachr. Ges. Wiss. Gottingen, Math. Phys. Klass, 202 (1928); see Elsevier, Encyclopedia of Organic Chemistry, Series III, 14, 75 (1940)] are known in the art. The phenyl carbamate of sitosterol is also known [Heiduschka and Gloth, Arch. Pharm., 253, 415 (1915)].

When following the separation procedure of this invention, either stigmasterol or sitosterol can be separated from a mixture of the two, e. g., soysterols, with only two reactions involved, viz., the esterification of the sterol mixture, to give the desired carbamate mixture and the hydrolysis of the separated stigmasteryl carbamate and/or sitosteryl carbamate. This process of separation is much shorter, compared with the four reactions of Windaus and the five reactions of U. S. Patent 2,520,143, and moreover eliminates the use of the expensive and somewhat dangerous and corrosive bromine. Thus with the techniques which have been developed for the separation of stigmasteryl carbamate, outstandingly high recoveries of the stigmasterol present in the original sterol mixture is obtained as evidenced by the examples hereinafter. For example, whereas the Windaus et al. method results in a recovery of no more than about 35 to 45 percent of the stigmasterol present in the average mixture of soysterols, about 65 to 85 percent of the stigmasterol present can be obtained from the same soysterols using the preferred separation procedures described hereinafter.

The process of the invention has the advantage that a mixture of a carbamate of stigmasterol and the corresponding carbamate of at least one of the sitosterols is more readily separable than is a mixture of the corresponding free sterols. Moreover, the preferred carbamate mixtures employed as starting material in the process of this invention permit the isolation therefrom of the carbamate of stigmasterol and/or sitosterol in high purity with surprising ease. Further reactions, designed to produce derivatives of stigmasterol and sitosterol which can be separated, such as brominations of the acetates of stigmasterol and sitosterol in mixture, are unnecessary to achieve separation or purification of one of the components of a mixture consisting essentially of one of the carbamates of stigmasterol and at least one of the sitosterols.

Included in the stigmasteryl carbamates, which can be isolated and purified according to the process of this invention, are those which are represented by Formula I above wherein R has the values given in Table III below. These carbamates, when purified to a high degree and then finally crystallized from the solvents shown, have the physical constants shown in Table III.

| Carbamate R = | Formula | M. W. | Analysis | | | | $[α]_D$ CHCl₃ | M. P., °C. (Kofler) | Crystallizing Solvent |
| | | | Calcd. | | Found | | | | |
| | | | C | H | C | H | | | |
| α-Naphthylamino | $C_{40}H_{55}NO_2$ | 581.84 | 82.56 | 9.53 | 82.21 | 9.38 | degrees −22 | 213–217 | Cyclohexane-Methylene chloride. |
| Phenylamino | $C_{36}H_{53}NO_2$ | 531.24 | 81.39 | 10.05 | 81.70 | 10.13 | −38 | 194.5–196.5 | Cyclohexane. |
| p-Nitrophenylamino | $C_{36}H_{52}N_2O_4$ | 576.80 | 74.96 | 9.09 | 74.94 | 9.23 | −34 | 228–230 | Ethyl acetate. |
| o-Biphenylamino | $C_{42}H_{57}NO_2$ | 607.89 | 82.98 | 9.45 | 83.18 | 9.30 | −18 | 194–196 | Cyclohexane. |
| p-Tolylamino | $C_{37}H_{55}NO_2$ | 545.82 | 81.41 | 10.15 | 81.71 | 10.41 | −36 | 194–196.5 | Skellysolve C. |
| o-Tolylamino | $C_{37}H_{55}NO_2$ | 545.82 | 81.41 | 10.15 | 81.75 | 10.24 | −35 | 166–168.5 | Acetone. |
| Octadecylamino | $C_{48}H_{85}NO_2$ | 702.17 | 81.24 | 12.20 | 81.53 | 11.89 | −27 | 104–105 | Ethyl acetate. |
| Diethylamino | $C_{34}H_{57}NO_2$ | 511.81 | 79.78 | 11.23 | 80.03 | 11.09 | −34 | 146–148.5 | Acetone. |
| n-Butylamino | $C_{34}H_{57}NO_2$ | 511.81 | 79.78 | 11.23 | 80.02 | 11.36 | −38 | 139–141 | Acetone-methanol. |
| $-NH_2$ | $C_{30}H_{49}NO_2$ | 455.70 | 79.06 | 10.84 | 79.07 | 11.12 | −48 | 225–229 | Ethyl acetate. |
| methylamino | $C_{31}H_{51}NO_2$ | 469.73 | 79.26 | 10.94 | 79.51 | 10.64 | −45 | 205–210 | Do. |
| dehydroabietylamino | $C_{50}H_{77}NO_2$ | 724.13 | 82.93 | 10.72 | 83.61 | 10.83 | +1 | 154–159 | Ethyl acetate-Acetone. |

Of the carbamates of the sitosterol fraction of soysterols, the carbamates of γ-sitosterol are of particular interest and particularly since γ-sitosterol constitutes the major fraction by weight of the soysterols and therefore is a plentiful precursor to the highly useful 17-keto steroids, for example, obtainable by the oxidation of a γ-sitosteryl carbamate with chromic acid, after protecting the double bond of the steroid nucleus with bromine or chlorine, in a similar manner to that disclosed in U. S. Patent 2,520,143.

The utility of stigmasterol as a precursor to known and useful steroids, e. g., pregnenolone, progesterone, and rosterone, has been well established [Heyl and Herr, J. Am. Chem. Soc., 72, 2617 (1950); Fieser and Fieser, "Natural Products Related to Phenanthrene," Third Edition, 385 to 387 (1949)]. These useful compounds have also been used to prepare other useful steroids, e. g., dihydroisoandrosterone, cortisone, hydrocortisone, testosterone, 17α,21-dihydroxyprogesterone, 21-hydroxyprogesterone, and many others.

The hydrolysis of the separated stigmasteryl carbamate or sitosteryl carbamate can be carried out according to usual procedures for effecting hydrolysis of esters. A particularly satisfactory method, however, involves the use of a single phase hydrolysis system, e. g., a solution of the carbamate in a somewhat water-soluble organic solvent, e. g. ethylene glycol, trimethylene glycol, propylene glycol, monoethers or esters of glycols, especially ethylene glycol monomethyl ether (Methyl "Cellosolve"), methanol, ethanol, etc., containing water and a hydrolyzing agent, e. g., hydrochloric acid, sulfuric acid, sodium hydroxide, potassium hydroxide, especially sodium hydroxide or potassium hydroxide which produce an almost quantitative hydrolysis. Although lower temperatures are operable to a lesser extent, the usual reaction temperature is about 100 degrees centigrade or higher, e. g., the boiling point of the reaction mixture.

The reaction time required to obtain satisfactory hydrolysis depends somewhat upon the reaction temperature, the hydrolyzing agent, and the carbamate to be hydrolyzed, about two hours being usually sufficient when potassium or sodium hydroxide is employed and the reaction mixture is maintained at about 100 degrees centigrade.

When the hydrolysis is substantially complete, the product can be extracted from the reaction mixture with benzene, toluene, methylene chloride, or other solvent in which the thus-obtained stigmasterol or sitosterol is significantly soluble, either before or after the neutralization of any acidic or alkaline materials in the reaction mixture. A suitable method involves dilution of the reaction mixture with water and then extracting with toluene. The amine produced in the reaction mixture will also be extracted if the reaction mixture is alkaline and this can be removed from the solvent extract by washing with aqueous acid. When the hydrolysis is performed under acidic conditions, the amine remains in the aqueous layer as an acid addition salt which can be neutralized and the amine recovered by conventional methods. Distilling the solvent from the extract leaves a distillation residue consisting essentially of the sterol, i. e., stigmasterol or a sitosterol. Alternatively, the reaction mixture can be diluted with water to precipitate the hydrolyzed sterol and the sterol filtered from the reaction mixture. Washing or slurrying the resulting precipitate with dilute aqueous acid will remove the amine which precipitates with the stigmasterol if the reaction mixture is alkaline.

The purity of the thus-produced stigmasterol will depend upon the efficiency of the separation technique and upon the reaction conditions for the formation and hydrolysis of the stigmasteryl carbamate. When optimum conditions are employed, the stigmasterol will be obtained in about ninety percent or better purity and will not require further purification for most purposes. A simple crystallization in the usual manner will purify somewhat the hydrolyzed stigmasterol.

The yield of hydrolyzed stigmasterol, calculated upon the isolated stigmasteryl carbamate, is usually from about 95 to 100 percent of the theoretical when the preferred hydrolysis conditions are employed. An overall recovery of the stigmasterol present in the starting sterol mixture of up to about ninety percent, as stigmasterol of about 90 to 95 percent purity, can be achieved when optimum conditions for the preparation, separation and hydrolysis steps are employed.

PREPARATION.—STERYL CHLOROFORMATE

Two hundred grams of sterols consisting of about twenty percent stigmasterol and the remainder a mixture of sitosterols were dissolved in one liter of hot benzene, boiled to remove any water and then filtered through diatomaceous earth. The filtrate was diluted with one liter of benzene and cooled to room temperature. Phosgene was then passed into the solution intermittently for about one hour. The solution was maintained at room temperature for one day and the solvent was then distilled at reduced pressure. The residue was dried at reduced pressure leaving 227.5 grams of steryl chloroformate having an $[\alpha]_D$ of minus 26 degrees.

FORMATION OF THE STERYL CARBAMATES

A. *Steryl methylcarbamate.*—A mixture of twenty milliliters of aqueous 25 percent methylamine and 23.8 grams of steryl chloroformate dissolved in 300 milliliters of benzene was shaken vigorously in a separatory funnel, the benzene layer separated, washed with water, and hydrochloric acid and finally with water. The benzene solution was filtered and distilled to dryness to yield 20.3 grams of steryl methylcarbamate.

B. *Steryl dehydroabietylcarbamate.*—Following the procedure described in Preparation A, but substituting an equimolar amount of dehydroabietylamine for the aqueous methyl amine, there was produced steryl dehydroabietylcarbamate in 97.5 percent yield.

C. *Soysteryl carbamate.*—Twenty grams of soysterols containing eighteen percent stigmasterol were dissolved in 200 milliliters of boiling methylene chloride, slurried with decolorizing charcoal and filtered through a bed of diatomaceous earth. The filtrate was cooled to room temperature and was maintained at that temperature while passing phosgene into the solution for one hour. The methylene chloride was distilled and the residue freed of solvent by heating at reduced pressure. The distillation residue was dissolved in 300 milliliters of dry methylene chloride and ammonia gas was passed into the solution for about twenty minutes. The reaction mixture was then concentrated to about 200 milliliters by distillation at atmospheric pressure. One hundred milliliters of fresh methylene chloride was added and the mixture, which now contained a precipitate, was filtered. The filtrate was concentrated until crystals began to form and 800 milliliters of acetone was then added. The solution was distilled to a volume of about 500 milliliters and crystals once more began to form. The mixture was cooled to about five degrees centigrade and the thus-precipitated crystals were collected by filtration and washed with cold acetone. There was thus obtained 16.5 grams, a yield of 75 percent of the theoretical, of soysteryl carbamate melting at 200 to 212 degrees centigrade (Kofler).

D. *Soysteryl n-butylcarbamate.*—Following the procedure described in Preparation C, using twenty grams of soysterols but substituting 11.1 grams of n-butylamine for the ammonia, there was obtained soysteryl n-butylcarbamate.

E. *Soysteryl -α-naphthylcarbamate.*—One hundred grams of soysterols consisting of eighteen percent stigmasterol were dissolved in one liter of hot benzene, a portion of which was then distilled to remove any water. A small portion of insoluble material was removed by filtration. The filtrate was cooled to thirty degrees centigrade in a two liter, three necked round bottomed flask equipped with a stirrer, thermometer, gas inlet tube extending to the bottom of the flask and a condenser. Phosgene was passed into the stirred solution at the rate of approximately 2.5 grams per minute for one half hour. The temperature of the mixture rose to forty degrees centigrade and a precipitate appeared. The addition of the phosgene was stopped and any dissolved phosgene removed by vacuum distillation of a portion of the benzene at forty degrees centigrade. Phosgene was then reintroduced into the solution until a total of about 100 grams had been added. The mixture was allowed to stand for about 45 minutes and then approximately one half of the solvent was distilled to remove any dissolved gases.

To the resulting solution of soysteryl chloroformate was added eighty grams of α-naphthylamine in 500 milliliters of dry benzene. The mixture was refluxed for fifty minutes and eight milliliters of concentrated hydrochloric acid was added to remove the unreacted α-naphthylamine. The resulting precipitate of 52.4 grams of α-naphthylamine hydrochloride was filtered and the filter cake washed well with hot benzene. The benzene was then distilled from the combined filtrate and washed to leave 141 grams, the theoretical yield, of soysteryl α-naphthylcarbamate.

Recrystallization of the thus-produced soysteryl α-naphthylcarbamate from about 750 milliliters of cyclohexane gave 118.5 grams, a yield of 84 percent of the theoretical, of soysteryl α-naphthylcarbamate melting at 168 to 185 degrees centigrade and consisting of twenty percent stigmasteryl α-naphthylcarbamate.

F. *Soysteryl α-naphthylcarbamate.*—One hundred grams of soysterols containing eighteen percent stigmasterol was dissolved in 800 milliliters of cyclohexane and about fifty milliliters of the solvent distilled to remove any water. The hot solution was mixed with five grams of Darco decolorizing charcoal and filtered through a bed of Celite diatomaceous earth. To the filtrate was added 47.5 grams of α-naphthylisocyanate and five milliliters of dry pyridine. The solution was refluxed for five hours and then cooled. The thus-produced precipitate of soysteryl α-naphthylcarbamate was filtered and washed with about 100 milliliters of cyclohexane. After drying, the crystals of soysteryl α-naphthylcarbamate weighed 118.5 grams, a yield of 82.5 percent of the theoretical, and melted at 168 to 185 degrees centigrade (Kofler).

G. *Soysteryl phenylcarbamate.*—Twenty grams (0.048 mole) of soysterols containing eighteen percent stigmasterol was dissolved in 300 milliliters of boiling cyclohexane. The solution was slurried with three grams of Darco decolorizing charcoal and filtered through a bed of Celite diatomaceous earth. The filtrate was concentrated to 225 milliliters by distillation and 6.55 grams (0.055 mole) of phenylisocyanate and a few drops of pyridine were added thereto. The solution was heated at the refluxing temperature of the cyclohexane for five hours and then allowed to cool to room temperature. The crystals which precipitated were filtered, washed with cyclohexane and dried. The soysteryl phenylcarbamate thus-obtained weighed 20.3 grams, a yield of 79 percent calculated on the soysterols, and melted at 168 to 176 degrees centigrade (Kofler).

H. *Soysteryl o-biphenylcarbamate.*—Following the procedure described in Preparation G, soysteryl α-biphenylcarbamate was prepared in 77 percent yield from soysterols and o-biphenylisocyanate in boiling cyclohexane. The reaction product crystallized overnight from the cooled cyclohexane and melted at 178 to 181 degrees centigrade.

I. *Soysteryl p-nitrophenylcarbamate.*—Following the procedure described in Preparation G, soysteryl p-nitrophenylcarbamate was prepared in 73 percent yield from soysterols and p-nitrophenylisocyanate in methylene chloride. The reaction product crystallized from the concentrated methylene chloride containing added ethyl acetate and methanol and melted at 217 to 220 degrees centigrade.

J. *Soysteryl o-tolylcarbamate.*—In the same manner as described in Preparation G, soysteryl o-tolylcarbamate was prepared from soysterols and o-tolylisocyanate in 63 percent yield and precipitated from the reaction mixture upon distillation of some of the cyclohexane.

K. *Soysteryl p-tolylcarbamate.*—In the same manner as described in Preparation G, soysteryl p-tolylcarbamate was prepared in 55 percent yield from p-tolylisocyanate and soysterols and melted at 184 to 187 degrees centigrade.

*Example 1.—Single crystallization of soysteryl α-naphthylcarbamate*

2.5-gram portions of soysteryl α-naphthylcarbamate consisting of twenty percent stigmasteryl α-naphthylcarbamate and the remainder of sitosteryl α-naphthylcarbamate were crystallized once from various solvents employing various volumes in excess of the amount theoretically required to dissolve all of the soysteryl α-naphthylcarbamate. The solvent ratio is the amount of solvent employed divided by the amount of solvent theoretically required to dissolve all of the sitosteryl α-naphthylcarbamate (see Table II). The results are shown in Table IV below.

TABLE IV.—SINGLE RECRYSTALLIZATIONS OF 2.5 GRAM SAMPLES OF SOYSTERYL α-NAPHTHYLCARBAMATE

| Solvent | Solvent Ratio | Precipitate Weight | Percent Stigmasteryl α-Naphthylcarbamate |
|---|---|---|---|
| Toluene | 1.25 | 0.68 | 65 |
|  | 1.5 | 0.71 | 59 |
|  | 1.75 | 0.62 | 61 |
|  | 2.0 | 0.53 | 63, 63 |
| Carbon tetrachloride | 1.25 | 0.80 | 57 |
|  | 1.5 | 0.78 | 58 |
|  | 1.75 | 0.63 | 60 |
|  | 2.0 | 0.38 | 60, 60 |
| Propylene chloride | 1.25 | 0.78 | 60 |
|  | 1.5 | 0.68 | 57 |
|  | 1.75 | 0.55 | 62 |
|  | 2.0 | 0.32 | 61, 62 |
| Ethyl acetate | 1.25 | 0.83 | 55 |
|  | 1.5 | 0.52 | 60 |
|  | 1.75 | 0.36 | 64 |
|  | 2.0 | 0.30 | 62 |
| Benzene | 1.25 | 0.79 | 59 |
|  | 1.5 | 0.63 | 61 |
|  | 1.75 | 0.53 | 62 |
|  | 2.0 | 0.46 | 60 |
| Chlorobenzene | 1.25 | 0.77 | 57 |
|  | 1.5 | 0.52 | 61 |
|  | 1.75 | 0.50 | 65 |
|  | 2.0 | 0.37 | 67 |
| Nitrobenzene | 1.25 | 0.79 | 57 |
| Ethyl ether | 1.25 | 1.03 | 49 |
| Methyl ethyl ketone | 1.25 | 0.82 | 57 |
| Cyclohexane | 1.25 | 0.84 | 48 |
| Methylcyclohexane | 1.25 | 0.71 | 48 |
| Chloroform | 1.25 | 0.48 | 67 |

*Example 1A.—Fractional crystallization from benzene*

In the manner described by Morton in "Laboratory Technique in Organic Chemistry," McGraw-Hill Book Company, page 162 (1938), 116.4 grams of soysteryl α-naphthylcarbamate containing 21.4 percent stigmasteryl α-naphthylcarbamate was crystallized in four stages using benzene as a solvent. The first, second and the recrystallized third fractions yielded a total of twenty grams of stigmasteryl α-naphthylcarbamate of 87 percent purity, representing a seventy percent recovery of the stigmasteryl α-naphthylcarbamate theoretically obtainable. The first fraction consisted of nine grams of stigmasteryl α-naphthylcarbamate of 92.3 percent purity, melting at 213 to 218 degrees centigrade and having an [α]$_D$ in chloroform of minus nineteen degrees. In comparison, stigmasteryl α-naphthylcarbamate prepared from stigmasterol and α-naphthylisocyanate, after recrystallization from a mixture of cyclohexane and methylene chloride, melted at 213 to 217 degrees centigrade and had an [α]$_D$ (chloroform) of minus 22 degrees and the analysis as follows:

Calculated for $C_{40}H_{55}NO_2$: C, 82.56; H, 9.53. Found: C, 82.21; H, 9.38.

Sitosteryl α-naphthylcarbamate free stigmasteryl α-naphthylcarbamate, which melted at 172 to 176 degrees centigrade, had an [α]$_D$ in chloroform of minus eight degrees, was obtained in the fourth fraction. In comparison, sitosteryl α-naphthylcarbamate prepared by reacting the sitosterols from soysterols with α-naphthylisocyanate melts at about 170 to 176 degrees centigrade.

Example 1B.—Fractional crystallization from cyclohexane

Twenty grams of soysteryl α-naphthylcarbamate consisting of twenty percent stigmasteryl α-naphthylcarbamate was fractionally crystallized in three stages from cyclohexane according to the method of Morton, "Laboratory Technique in Organic Chemistry," McGraw-Hill Book Company, page 162 (1938), to give in the first fraction, 2.71 grams of stigmasteryl α-naphthylcarbamate of 82 percent purity, melting at 204 to 211 degrees centigrade and having an $[\alpha]_D$ in chloroform of minus seventeen degrees. This yield represents a 55.5 percent recovery of the stigmasteryl α-naphthylcarbamate present in the original mixture.

Fraction three yielded 10.31 grams, a 64.5 percent recovery of the theoretical amount, of substantially pure sitosteryl α-naphthylcarbamate melting at 170 to 174 degrees centigrade and having an $[\alpha]_D$ in chloroform of minus seven degrees.

Example 2.—Crystallization of soysteryl α-naphthylcarbamate

Five grams of soysteryl α-naphthylcarbamate of the same composition as that used in Example 1 was dissolved in 1.1 liters of Skellysolve C (hexane hydrocarbons) and two crystal crops collected. The first 1.19-gram crystal crop contained 49.8 percent stigmasteryl α-naphthylcarbamate. The second 0.92-gram crystal crop contained 37.8 percent stigmasteryl α-naphthylcarbamate. The residual mother liquor contained 2.72 grams of solids consisting of sitosteryl α-naphthylcarbamate substantially free of stigmasteryl α-naphthylcarbamate.

Example 3.—Crystallization of soysteryl α-naphthylcarbamate

Ten grams of soysteryl α-naphthylcarbamate of the same composition as that employed in Example 1 was crystallized three times from benzene. The first mother liquor of eighty milliliters contained 72 percent of the total solids and contained 63 percent stigmasteryl α-naphthylcarbamate. The second mother liquor of forty milliliters contained ten percent of the total solids and contained 18.4 percent stigmasteryl α-naphthylcarbamate. The third mother liquor contained 0.35 percent of the total solids and contained 26.2 percent stigmasteryl α-naphthylcarbamate. The crystal crop represented 14.1 percent of the total solids and contained 86.1 percent stigmasteryl α-naphthylcarbamate.

Example 4.—Triangular crystallization of soysteryl phenylcarbamate

Following the crystallization technique shown in Figure 3 of the drawings [see Morton, "Laboratory Techniques in Organic Chemistry," McGraw-Hill (1938), page 162], soysteryl phenylcarbamate of nineteen percent stigmasteryl carbamate content was separated in four stages into five fractions of the following stigmasteryl phenylcarbamate content:

a. From cyclohexane: $F_1$, 56 percent; $F_2$, 25 percent; $F_3$, 5 percent; $F_4$, 0 percent; $F_5$, 0 percent.

b. From ethyl acetate: $F_1$, 63 percent; $F_2$, 44 percent; $F_3$, 21 percent; $F_4$, 0 percent; $F_5$, 0 percent.

Example 5.—Soysteryl α-naphthylcarbamate a. Following the procedure of Example 4, soysteryl α-naphthylcarbamate of approximately twenty percent stigmasteryl α-naphthylcarbamate content was separated using benzene into five fractions having the following stigmasteryl α-naphthlycarbamate content: $F_1$, 92 percent; $F_2$, 80 percent; $F_3$, 36 percent; $F_4$, 0 percent; $F_5$, 4 percent.

Examples 6 through 13

Following the procedure of Example 4, the following soysteryl carbamates were separated into fractions of the stigmasteryl carbamate content as shown in Table V.

TABLE V

| Soysteryl Carbamate | Solvent | No. of Stages | Percent Stigmasteryl Carbamate Content ||||||
|---|---|---|---|---|---|---|---|---|
| | | | $F_1$ | $F_2$ | $F_3$ | $F_4$ | $F_5$ | $F_6$ |
| 6. o-biphenyl | cyclohexane | 4 | 54 | 42 | 24 | 11 | 4 | |
| 7. p-nitrophenyl | ethyl acetate | 3 | 52 | 21 | 4 | 0 | | |
| 8. o-tolyl | acetone | 3 | 29 | 27 | 11 | 8 | | |
| 9. p-biphenyl | cyclohexane | 4 | 21 | 46 | 30 | 15 | 6 | |
| 10. n-butyl | acetone | 5 | 9 | 35 | 26 | 28 | 18 | <15 |
| 11. Unsubstituted | $CH_3COOC_2H_5$ | 3 | 44 | 19 | 14 | 15 | | |
| 12. methyl | benzene | 3 | 22 | 13 | 6 | <5 | | |
| 13. N-dehydroabietyl | benzene, ethanol, ethyl acetate | 3 | 6 | 9 | 15 | 18 | | |

In Examples 10 and 13, the carbamate which was purified was the sitosteryl carbamate, which was increased in purity from a starting purity of about 82 percent to a purity of about 95 percent in one of the fractions in each example.

Example 14.—Leaching of soysteryl α-naphthylcarbamate

Ten-gram portions of soysteryl α-naphthylcarbamate containing twenty percent stigmasteryl α-naphthylcarbamate were leached with various solvents from three to six times, using equal portions of solvent for each leaching. The undissolved residue was assayed for stigmasteryl α-naphthylcarbamate. The results are shown in Table VI below.

TABLE VI.—SERIAL EXTRACTION OF SOYSTERYL α-NAPHTHYLCARBAMATE WITH VARIOUS SOLVENTS

| Solvent | Total Vol. of Solvent (Ml.) | Number of Leachings | Residue Weight (Percent Yield) | Percent Stigmasteryl α-Naphthyl-carbamate | M. P. (°C.) of Residue |
|---|---|---|---|---|---|
| ether | 650 | 3 | 14.4 | 82 | 204–213 |
| cyclohexane (at 63°) | 400 | 3 | 11.1 | 85 | 208–215 |
| Skellysolve C (at 73°) | 400 | 3 | 15.8 | 77 | 204–212 |
| benzene | 170 | 6 | 12.3 | 88 | 210–216 |

Example 15.—Leaching of soysteryl α-naphthylcarbamate 2.5-gram samples of soysteryl α-naphthylcarbamate containing approximately twenty percent stigmasteryl α-naphthylcarbamate were leached three times with various solvents. The ratio of the total volume of solvent employed to the calculated amount was varied with some of the solvents. The calculated amount is the amount necessary to dissolve all of the sitosteryl α-naphthylcarbamate. The results of these experiments are shown in Table VII below.

TABLE VII

| | Total Volume | | Weight of Residue | Percent Stigmasteryl α-Naphthyl-carbamate |
|---|---|---|---|---|
| | Milliliters | Ratio Calcd. | | |
| chlorobenzene | 12.6 | 1.25 | 0.69 | 67 |
| | 15.1 | 1.5 | .61 | 75 |
| | 17.6 | 1.75 | .56 | 77 |
| | 20.2 | 2.0 | .48 | 78 |
| ethyl acetate | 100 | 1.25 | 0.93 | 54 |
| | 120 | 1.5 | .90 | 56 |
| | 140 | 1.75 | .59 | 69 |
| | 160 | 2.00 | .58 | 73 |
| benzene | 19.0 | 1.25 | 0.78 | 60 |
| | 22.8 | 1.5 | .68 | 65 |
| | 26.6 | 1.75 | .62 | 72 |
| | 30.4 | 2.0 | .55 | 75 |
| propylene chloride | 32.0 | 1.25 | 0.72 | 51 |
| | 38.4 | 1.5 | .62 | 70 |
| | 44.8 | 1.75 | .59 | 75 |
| | 51.2 | 2.0 | .55 | 75 |
| carbon tetrachloride | 18 | 1.25 | 1.01 | 49 |
| toluene | 19 | 1.25 | 0.66 | 55 |
| nitrobenzene | 44 | 1.25 | 0.76 | 59 |
| ethyl ether | 58 | 1.25 | 0.85 | 57 |
| cyclohexane | 167 | 1.25 | 1.29 | 40 |
| methylcyclohexane | 250 | 1.25 | 1.19 | 43 |
| chloroform | 7.2 | 1.25 | 0.50 | 76 |
| pyridine | 18.6 | 1.25 | 0.84 | 88 |

*Example 16.—Leaching of soysteryl α-naphthylcarbamate*

A 12.5-gram sample of soysteryl α-naphthylcarbamate containing eighteen percent stigmasteryl α-naphthylcarbamate and the remainder essentially sitosteryl α-naphthylcarbamate was leached with six 25-milliliter portions of chlorobenzene for thirty minutes per portion. The solids in each mother liquor were weighed and analyzed and the solids remaining after each leaching were dried, weighed and analyzed for stigmasteryl α-naphthylcarbamate. The results are shown in Table VIII below.

TABLE VIII

| Leach | Residue | | Mother Liquors | |
|---|---|---|---|---|
| | Weight, Grams | Percent Stigmasteryl α-Naphthyl-carbamate | Weight, Grams | Percent Sitosteryl α-Naphthyl-carbamate |
| 1 | 6.37 | 34 | 4.63 | 100 |
| 2 | 3.58 | 61 | 3.34 | 95 |
| 3 | 2.58 | 77 | 1.27 | 86 |
| 4 | 2.11 | 86 | .72 | 76 |
| 5 | 1.79 | 89 | .40 | 54 |
| 6 | 1.45 | 95 | .32 | 32 |
| Total | | | 10.68 | |

*Example 17.—Countercurrent leaching of soysteryl α-naphthylcarbamate*

Soysteryl α-naphthylcarbamate containing 21 percent stigmasteryl α-napthylcarbamate was extracted in the fashion shown in Figure 4. A 12.5-gram portion ($M_1$) was leached with six 25-milliliter portions of chlorobenzene ($S_1$ to $S_6$). The residue ($R_1$) was analyzed for stigmasteryl α-naphthylcarbamate. A second 12.5-gram portion ($M_2$) was leached with the six mother liquors obtained from the leachings of the first portion, in the same order. The residue ($R_2$) was analyzed. A third 12.5-gram portion ($M_2$) was leached with the six mother liquors obtained from the leachings of the second portion, in the same order. The residue ($R_3$) and the mother liquors ($E_1$ to $E_6$) were analyzed. The results are shown in Table IX below.

TABLE IX

| Fraction | Weight in Grams | Percent Stigmasteryl α-Naphthyl-carbamate | Yield of Stigmasteryl α-Naphthyl-carbamate |
|---|---|---|---|
| $R_1$ | 1.70 | 87 | 57 |
| $R_2$ | 3.31 | 79 | 100 |
| $R_3$ | 4.73 | 55 | 100 |
| $E_1$ | 3.29 | 0 | |
| $E_2$ | 5.81 | 0 | |
| $E_3$ | 6.85 | 0 | |
| $E_4$ | 6.52 | 0 | |
| $E_5$ | 3.65 | 0 | |
| $E_6$ | 1.81 | 6.4 | |

*Example 18.—Countercurrent leaching of soysteryl α-naphthylcarbamate*

141 grams of soysteryl α-naphthylcarbamate containing eighteen percent stigmasteryl α-naphthylcarbamate was divided into five 28.2-gram portions. The first portion was extracted for thirty minutes each with six fifty-milliliter portions of chlorobenzene. The mother liquors from the first two extracts were combined and the solvent removed to leave a distillation residue consisting of sitosteryl α-naphthylcarbamate of approximately 98 percent purity. The last four mother liquors were combined, the solvent removed and the residue added to the second 28.2-gram lot. The residue from the six extractions weighed 3.14 grams.

The second 28.2-gram portion containing the residues from the last four mother liquors of the extractions of the first portion was extracted in the same manner with six fifty-milliliter portions of chlorobenzene and the residues from the last four mother liquors were added to the third 28.2-gram portions. The third, fourth and fifth 28.2-gram portions were treated in the identical manner. From the second, third, fourth and fifth portions was obtained 4.35, 4.48, 4.52 and 4.19 grams, respectively, of insoluble residue from the extractions. The five insoluble residues were combined to give 20.68 grams of stigmasteryl α-naphthylcarbamate of approximately 91 percent purity. Additional stigmasteryl α-naphthylcarbamate of approximately the same purity can be obtained by reworking the last four mother liquors from the extraction of the fifth portion.

The thus-obtained stigmasteryl α-naphthylcarbamate was hydrolyzed with 10.4 grams of potassium hydroxide in 45 milliliters of water and 600 milliliters of methoxyethanol for two hours at the refluxing temperautre to yield 13.5 grams of stigmasteryl of 91.3 percent purity, melting at 167 to 170 degrees centigrade.

*Example 19.—Semicontinuous countercurrent leaching of soysteryl α-naphthylcarbamate*

Soysteryl α-naphthylcarbamate consisting of eighteen percent stigmasteryl α-naphthylcarbamate was leached according to the procedure shown in Figure 5 of the drawings. A 12.5-gram portion ($M_1$) was leached with six 25-milliliter portions of chlorobenzene ($S_1$ to $S_6$) leaving an insoluble residue $R_1$. The last four mother liquors were used, in the same order, to leach a second 12.5-gram portion ($M_2$) of the same soysteryl α-naphthylcarbamates. The insoluble residue was then leached with two more 25-milliliter portions of chlorobenzene ($S'_5$ and $S'_6$). The same procedure was employed on a third 12.5-gram portion ($M_3$) of soysteryl α-naphthylcarbamate, using the last four mother liquors from the second series of leachings and lastly, two portions of chlorobenzene ($S''_5$ and $S''_6$). The first two mother liquors ($E_1$ and $E_2$, $E'_1$ and $E'_2$, and $E''_1$ and $E''_2$) from each of the series of leachings consisted essentially of sitosteryl α-naphthylcarbamate. The three residues and last six extracts were analyzed. The results are shown in Table X below.

TABLE X

| Fraction | Weight Grams | Percent Stigmasteryl α-Naphthylcarbamate | Percent Stigmasteryl α-Naphthylcarbamate Recovered |
| --- | --- | --- | --- |
| $R_1$ | 1.29 | 92 | 53 |
| $R_2$ | 2.03 | 91 | 82 |
| $R_3$ | 2.13 | 92 | 87 |
| $E''_1$ | 4.6 | 1 | |
| $E''_2$ | 3.3 | 3 | |
| $E''_3$ | 1.3 | 12 | |
| $E''_4$ | 0.7 | 21 | |
| $E''_5$ | .4 | 35 | |
| $E''_6$ | .3 | 54 | |

Similarly, other techniques of separation, i. e., sublimation, distillation at high vacuum, chromatography over carbon, Florisil magnesium silicate, aluminum oxide, or the like, countercurrent extraction and other separation techniques produce more desirable results when applied to the separation of the mixtures of soysteryl α-naphthylcarbamates than to the mixture of soysterols themselves or their acetates.

HYDROLYSIS OF STIGMASTERYL α-NAPHTHYL-CARBAMATE

A. To a solution of 2.4 grams (0.06 mole) of sodium hydroxide dissolved in 2.4 milliliters of water and eighty milliliters of Methyl "Cellosolve" brand of methoxyethanol was added twenty milliliters of toluene following by 11.64 grams (0.02 mole) of stigmasteryl α-naphthylcarbamate. The resulting mixture was heated at its refluxing temperature for three hours after which forty milliliters of toluene and a mixture of eighty milliliters of water and twenty milliliters of Methyl "Cellosolve" were added. The mixture was kept at 65 to 75 degrees centigrade while separating the aqueous phase which was then extracted with thirty milliliters of toluene. The toluene phase and toluene extract were combined and extracted at 65 to seventy degrees centigrade with 100 milliliters of 2.0 N hydrochloric acid and then twice with 100-milliliter portions of water. The toluene phase was separated and distilled to dryness to yield 8.0 grams, a yield of 95 percent of the theoretical, of stigmasterol of 92.2 percent purity ($[\alpha]_D = -49°$).

Distillation of the aqueous phase and extracts gave four milliliters of a water-toluene-"Cellosolve" ternary boiling at 82 to 89 degrees centigrade; 46 milliliters of a water-"Cellosolve" binary boiling at 99 to 100 degrees centigrade and consisting of 15.3 percent Methyl "Cellosolve" by weight; eleven milliliters of a water-"Cellosolve" codistillate boiling at 100 to 122 degrees centigrade and sixty milliliters of Methyl "Cellosolve" boiling at 122 to 123.5 degrees centigrade.

B. Following the procedure described above, but substituting sitosteryl α-naphthylcarbamate for the stigmasteryl α-naphthylcarbamate, substantially pure sitosterol is obtained in about 95 percent yield from the hydrolysis.

C. To a solution of 10.4 grams of 85 percent potassium hydroxide in 45 milliliters of water was added 600 milliliters of Methyl "Cellosolve" followed by 22 grams of stigmasteryl α-naphthylcarbamate. The resulting mixture was boiled for about two hours at its refluxing temperature until a clear solution was obtained. After cooling the solution to room temperature there was added 140 milliliters of water with swirling. The precipitated stigmasterol was filtered and washed by reslurrying with two 150-milliliter portions of water. After drying at about fifty degrees centigrade under a vacuum of fifty millimeters of mercury, the precipitate weighed fourteen grams, melted at 166 to 168 degrees centigrade and assayed 93 percent stigmasterol.

D. Following the procedure described above, the steryl carbamates disclosed in the Preparations and the stigmasteryl carbamates shown in Table III were hydrolyzed using water, Methyl "Cellosolve" and potassium hydroxide with the exception of the n-butylcarbamates which required boiling for two hours in propylene glycol containing potassium hydroxide and a small amount of water, and the diethylcarbamate which requires boiling for several hours in trimethylene glycol containing water and potassium hydroxide.

*Example 20.—Isolation of stigmasterol from soysterols*

A. *Formation of soysteryl α-naphthylcarbamate.*—A 28.2-gram (0.0684-mole) portion of soysterols containing about eighteen percent stigmasterol was heated at 140 to 145 degrees centigrade at reduced pressure until the melt ceased to bubble. Dry nitrogen was introduced into the reaction flask and to the melt was added one milliliter of dry 2,4-lutidine and ten milliliters (11.77 grams; 0.0695 mole) of α-naphthylisocyanate. The temperature of the mixture rose to 160 to 165 degrees centigrade during the addition and this temperature was maintained for 35 minutes. The 41 grams of melt was poured into a crystallization dish in a thin layer to crystallize. After crystallization was complete, the material was broken into small particles for the separation of the stigmasteryl α-naphthylcarbamate.

B. *Separation of stigmasteryl α-naphthylcarbamate.*—A 28.2-gram sample of the 41 grams of crude soysteryl α-naphthylcarbamate was extracted with six fifty-milliliter portions of chlorobenzene, stirring the mixture for about ten minutes during each extraction. The residue after the sixth extraction weighed 3.17 grams, a 57 percent yield of the stigmasterol present in the starting sterols.

C. *Hydrolysis of separated stigmasteryl α-naphthylcarbamate.*—The thus-obtained 3.17 grams of stigmasteryl α-naphthylcarbamate was hyrolyzed in the manner described in the foregoing section entitled Hydrolysis of stigmasteryl α-naphthylcarbamate, subparagraph C thereof, in 97 percent yield to give stigmasterol of 91 percent purity.

*Example 21.—Isolation of stigmasterol from soysterols*

A. *Formation of soysteryl α-naphthylcarbamate.*—In exactly the same manner described in Example 20A, 100 grams of soysterols of eighteen percent stigmasterol content were converted into 141 grams of soysteryl α-naphthylcarbamate. The yield in this reaction was 100 percent of the theoretical.

B. *Separation of stigmasteryl α-naphthylcarbamate.*—Of the 141 grams of soysteryl α-naphthylcarbamate obtained in the manner described above, 50.0 grams were divided into four 12.5-gram samples. The stigmasteryl α-naphthylcarbamate theoretically present was 2.25 grams per sample or a total of 9.0 grams.

Another 12.5-gram sample of this soysteryl α-naphthylcarbamate was extracted with six twenty-milliliter portions of chlorobenzene, keeping the mother liquors separate, leaving 1.28 grams of stigmasteryl α-naphthylcarbamate. The mother liquors therefore contained a total of 11.22 grams of soysteryl α-naphthylcarbamates of 10.8 percent stigmasteryl α-naphthylcarbamate content. The first two of these mother liquors contained sitosteryl α-naphthylcarbamate substantially free from stigmasteryl α-naphthylcarbamate.

The first of the four 12.5-gram samples described above was extracted successively with the last four mother liquors in the order obtained from the extraction described above and then with two twenty-milliliter portions of fresh chlorobenzene. There remained after these leachings 2.16 grams of stigmasteryl α-naphthylcarbamate of about ninety percent purity. The second, third, and fourth 12.5-gram samples were treated in the same manner, i. e., extracted with the mother liquors obtained from the previous extraction and then with two twenty-milliliter portions of fresh chlorobenzene. There was thus obtained 2.26 grams of stigmasteryl α-naphthylcarbamate of high purity from the second sample, 2.25 grams from the third and 2.32 grams from the fourth, or a total of 9.09 grams of stigmasteryl α-naphthylcarbamate of between ninety and 95 percent purity. The theoretical stigmasteryl α-naphthylcarbamate content of the four samples was 9.0 grams.

C. *Hydrolysis of stigmasteryl α-naphthylcarbamate.*—The four solid residues obtained from the leachings described above were hydrolyzed separately to produce four samples of stigmasterol. The first sample gave 1.39 grams of stigmasterol of ninety percent purity, a 91 percent yield; the second, 1.47 grams of 93 percent purity, a 91.4 percent yield; the third, 1.46 grams of ninety percent purity, a 91.8 percent yield; and the fourth, 1.51 grams of 92 percent purity, a 92 percent yield. The total yield of stigmasterol, of an average 91 percent purity, was 5.83 grams of pure stigmasterol. The theoretical yield of stigmasterol from these four samples calculated from the stigmasterol content of the starting sterols was 6.4 grams. The recovery of the stigmasterol present in the starting soysterols therefore was 83 percent.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. A process for the purification of a steroid which comprises the steps of (1) converting a sterol mixture consisting essentially of stigmasterol and at least one of the sitosterols into a mixture of one of their corresponding carbamates, (2) fractionating the mixture into a dissolved portion and an undissolved portion by contacting the mixture with organic solvent, (3) separating the portion enriched with the desired carbamate from the organic solvent and from the portion enriched with the undesired carbamate, (4) fractionating the portion enriched with the desired carbamate into a dissolved portion and an undissolved portion by contacting the enriched portion with organic solvent, and (5) repeating steps 3 and 4 at least once.

2. The process of claim 1 wherein the fractionation of the mixture with organic solvent is achieved by leaching the mixture with the solvent.

3. The process of claim 1 wherein the fractionation of the mixture with organic solvent is achieved by crystallizing the mixture with the solvent.

4. The process of claim 1 wherein the starting sterol mixture is converted to an arylcarbamate.

5. The process of claim 1 wherein the starting sterol mixture is converted to its α-naphthylcarbamate.

6. The process of claim 1 wherein the starting sterol mixture is converted to its phenylcarbamate.

7. A process for the separation of a steroid mixture which comprises the steps of (1) converting a mixture of stigmasterol and sitosterol into a mixture of their corresponding α-naphthylcarbamates, (2) leaching the mixture with an organic solvent thereby fractionating the mixture into an undissolved portion enriched with stigmasteryl α-naphthylcarbamate and a dissolved portion enriched with sitosteryl α-naphthylcarbamate, (3) separating the undissolved portion from the organic solvent containing the dissolved portion, (4) leaching the separated undissolved portion enriched with stigmasteryl α-naphthylcarbamate with an organic solvent thereby fractionating the mixture into an undissolved portion further enriched with stigmasteryl α-naphthylcarbamate and a dissolved portion, and (5) continuing steps 3 and 4 at least once more and until stigmasteryl α-naphthylcarbamate of desired purity is obtained.

8. The process of claim 7 wherein the leaching is conducted at about room temperature.

9. The process of claim 7 wherein the leaching solvent is chlorobenzene.

10. A process for the separation of stigmasteryl α-naphthylcarbamate from a mixture of soysteryl α-naphthylcarbamates which includes the steps of (1) leaching a portion of stigmasteryl α-naphthylcarbamate in admixture with sitosteryl α-naphthylcarbamate with at least two successive portions of chlorobenzene, wherein each portion of the chlorobenzene has a volume of between about one and about three milliliters per gram of the original admixture and contains dissolved stigmasteryl α-naphthylcarbamate and sitosteryl α-naphthylcarbamate, the amount of sitosteryl α-naphthylcarbamate decreasing and the proportion of stigmasteryl α-naphthylcarbamate to sitosteryl α-naphthylcarbamate increasing with successive portions, (2) leaching the residual undissolved solids with at least one portion of chlorobenzene which has a volume of between about one and about three milliliters per gram of the original admixture, (3) separating the undissolved stigmasteryl α-naphthylcarbamate, and (4) repeating steps 1, 2 and 3 employing a second portion of stigmasteryl α-naphthylcarbamate in admixture with sitosteryl α-naphthylcarbamate, and employing as the portions of chlorobenzene containing dissolved stigmasteryl α-naphthylcarbamate and sitosteryl α-naphthylcarbamate, at least all except the first two of the mother liquors of step 1 in the order obtained.

11. The process of claim 10 wherein the leaching temperature is about room temperature.

12. A process for the separation of stigmasteryl α-naphthylcarbamate from admixture with sitosteryl α-naphthylcarbamate which includes the steps of (1) leaching a portion of stigmasteryl α-naphthylcarbamate in admixture with sitosteryl α-naphthylcarbamate with at least four successive portions of chlorobenzene, wherein each portion of the chlorobenzene has a volume of between about one and about three milliliters per gram of original admixture and contains dissolved stigmasteryl α-naphthylcarbamate and sitosteryl α-naphthylcarbamate, the amount of sitosteryl α-naphthylcarbamate decreasing and the proportion of stigmasteryl α-naphthylcarbamate to sitosteryl α-naphthylcarbamate increasing with successive portions, (2) leaching the residual undissolved solids with two successive portions of chlorobenzene each of which has a volume of between about one and about three milliliters per gram of original admixture, (3) separating the undissolved stigmasteryl α-naphthylcarbamate, and (4) repeating steps 1, 2 and 3 employing a second portion of stigmasteryl α-naphthylcarbamate in admixture with sitosteryl α-naphthylcarbamate and employing as the portions of chlorobenzene containing stigmasteryl α-naphthylcarbamate and sitosteryl α-naphthylcarbamate all except the first two of the mother liquors of step 1 in the order obtained.

13. The process of claim 12 wherein the leaching temperature is about room temperature and each portion of leaching solvent has a volume of about two milliliters per gram of original admixture.

14. The process which comprises converting a mixture of stigmasterol and sitosterol to a mixture of stigmasteryl α-naphthylcarbamate and sitosteryl α-naphthylcarbamate and separating at least a portion of the thus-produced stigmasteryl α-naphthylcarbamate and sitosteryl α-naphthylcarbamate from each other.

15. The process which comprises reacting a mixture of stigmasterol and sitosterol with a member of the group consisting of (1) α-naphthylisocyanate and (2) phosgene and α-naphthylamine, to produce a mixture of stigmasteryl α-naphthylcarbamate and sitosteryl α-naphthylcarbamate and separating at least a portion of the thus-produced stigmasteryl α-naphthylcarbamate and sitosteryl α-naphthylcarbamate from each other.

16. The process which comprises reacting a mixture of stigmasterol and sitosterol with α-naphthylisocyanate to produce a mixture of stigmasteryl α-naphthylcarbamate and sitosteryl α-naphthylcarbamate and separating stigmasteryl α-naphthylcarbamate and sitosteryl α-naphthylcarbamate from each other.

17. The process which comprises reacting a mixture of stigmasterol and sitosterol with phosgene followed by α-naphthylamine to produce a mixture of stigmasteryl α-naphthylcarbamate and sitosteryl α-naphthylcarbamate and separating stigmasteryl α-naphthylcarbamate and sitosteryl α-naphthylcarbamate from each other.

18. The process which comprises converting the soysterols of the soysterol fraction of soybean oil to a mixture of soysteryl α-naphthylcarbamates and separating stigmasteryl α-naphthylcarbamate from the mixture.

19. The process of claim 18 wherein the mixture of soysteryl α-naphthylcarbamates is produced by the reaction of the soysterols with α-naphthylisocyanate.

20. The process of claim 18 wherein the mixture of soysteryl α-naphthylcarbamates is produced by the reaction of the soysterols with phosgene followed by α-naphthylamine.

21. A process for the isolation of sitosterol from admixture with stigmasterol which comprises converting the mixture of stigmasterol and sitosterol to a mixture of stigmasteryl α-naphthylcarbamate and sitosteryl α-naphthylcarbamate, separating the stigmasteryl α-naphthylcarbamate and sitosteryl α-naphthylcarbamate, and hydrolyzing the separated sitosteryl α-naphthylcarbamate to produce sitosterol.

22. A process for the isolation of stigmasterol from admixture with sitosterol which comprises converting the mixture of stigmasterol and sitosterol to a mixture of stigmasteryl α-naphthylcarbamate and sitosteryl α-naphthylcarbamate, separating the stigmasteryl α-naphthylcarbamate and sitosteryl α-naphthylcarbamate, and hydrolyzing the separated stigmasteryl α-naphthylcarbamate to produce stigmasterol.

23. The process of claim 22 wherein the mixture of stigmasteryl α-naphthylcarbamate and sitosteryl α-naphthylcarbamate is produced by the reaction of the mixture of stigmasterol and sitosterol with α-naphthylisocyanate.

24. The process of claim 22 wherein the mixture of stigmasteryl α-naphthylcarbamate and sitosteryl α-naphthylcarbamate is produced by the reaction of the mixture of stigmasterol and sitosterol with phosgene followed by α-naphthylamine.

25. The process of claim 22 wherein the separation is by fractional solution in an organic solvent.

26. The process of claim 22 wherein the separation is by leaching with an organic solvent.

27. The process of claim 22 wherein the stigmasteryl α-naphthylcarbamate is hydrolyzed with an alkaline hydrolyzing agent.

28. The process of claim 22 wherein the stigmasteryl α-naphthylcarbamate is hydrolyzed with an alkali-metal hydroxide.

29. A process for the isolation of stigmasterol from a mixture of soysterols which comprises heating a mixture of the soysterols and α-naphthylisocyanate between about 130 and about 170 degrees centigrate to produce a mixture of soysteryl α-naphthylcarbamates, separating stigmasteryl α-naphthylcarbamate from the mixture and hydrolyzing the separated stigmasteryl α-naphthylcarbamate in a single phase system with an alkali-metal hydroxide to produce stigmasterol.

30. The process of claim 29 wherein the single phase hydrolysis system comprises stigmasteryl α-naphthylcarbamate, sodium hydroxide, water, and a water-miscible solvent for the stigmasteryl α-naphthylcarbamate.

31. A process for the production of stigmasterol which comprises separating stigmasteryl α-naphthylcarbamate from admixture with sitosteryl α-naphthylcarbamate and hydrolyzing the separated stigmasteryl α-naphthylcarbamate to produce stigmasterol.

32. Stigmasteryl α-naphthylcarbamate.

References Cited in the file of this patent

UNITED STATES PATENTS

| | | |
|---|---|---|
| 2,173,629 | Milas | Sept. 19, 1939 |
| 2,362,932 | Rosenberg | Nov. 14, 1944 |
| 2,394,615 | Jenkins | Feb. 12, 1946 |
| 2,503,385 | Gould | Apr. 11, 1950 |
| 2,598,468 | Vaterrodt | May 28, 1952 |

OTHER REFERENCES

Blohm: Chem. Rev. 51, 471–504 (1952).

Shriner et al.: Identification of Organic Compounds, 3rd ed., pp. 159–164, 226–228 (1948).